(12) United States Patent
Hsu

(10) Patent No.: US 7,071,921 B2
(45) Date of Patent: Jul. 4, 2006

(54) ERGONOMIC MOUSE

(75) Inventor: Tien-Ho Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 274 days.

(21) Appl. No.: 10/383,541

(22) Filed: Mar. 10, 2003

(65) Prior Publication Data
US 2004/0178990 A1 Sep. 16, 2004

(51) Int. Cl.
G09G 5/00 (2006.01)
(52) U.S. Cl. .................................. 345/163; 345/161
(58) Field of Classification Search .............. 345/156, 345/157, 161, 163, 164, 167; D14/402–410
See application file for complete search history.

(56) References Cited
U.S. PATENT DOCUMENTS 6,204,838 B1 * 3/2001 Wang et al. ............... 345/161
6,262,715 B1 * 7/2001 Sawyer ...................... 345/163
6,362,811 B1 * 3/2002 Edwards et al. ........... 345/163
6,377,245 B1 * 4/2002 Park .......................... 345/163
6,515,650 B1 * 2/2003 Arita et al. ................ 345/156
6,921,054 B1 * 7/2005 Doan ...................... 248/118.5

* cited by examiner

Primary Examiner—Amr A. Awad
Assistant Examiner—Tom Sheng
(74) Attorney, Agent, or Firm—Birch, Stewart, Kolasch & Birch, LLP

(57) ABSTRACT

An ergonomic mouse provides comfortable holding by user's palm and convenient operation by user's finger. The ergonomic mouse comprises a mouse body, a holding stick and a button member. The holding stick comprises an abutting section and a bottom pivotally assembled to a top portion of the mouse body to expose the abutting section out of the top portion. The button member is pivotally connected to a finger operation position at front end of the mouse body. The holding stick and the button member can be pivotally inclined to provide comfortable and convenient operation for user.

5 Claims, 6 Drawing Sheets

ERGONOMIC MOUSE

FIELD OF THE INVENTION

The present invention relates to an ergonomic mouse, especially to an ergonomic mouse adapted for palm movement and finger operation.

BACKGROUND OF THE INVENTION

The computer mouse is inevitable input means for computer user to move cursor on screen and click for executing program or highlighting text.

FIG. 1 shows a perspective view of a conventional mouse with a body 4. The body 4 has a curved top side 40 for the convenient holding of user's palm and buttons 41 at front side of the body 4 for operation of user's finger.

FIG. 2 shows a perspective view of another conventional mouse with a body 4'. The body 4' has a slantingly curved top side 40' for tight holding of user's palm and buttons 41' at front side of the body 4' for operation of user's finger.

The mouse shown in FIG. 1 is used for both right-hand user and left-hand user by providing symmetric curve and button position, however, the user's palm can not be tightly attached. The mouse shown in FIG. 2 is used either for right-hand user or left-hand user by providing slantingly curve and button position. The user's palm has tight attachment to the mouse, however, the usage of the mouse is limited to either right-hand user or left-hand user. This results problem of stock and cost. Moreover, in the two kinds of mice mentioned above are integrally formed and are inherently prohibited for dexterous palm movement and finger operation. Therefore, the user may feel hand fatigue or even get syndrome after long time use of mouse.

SUMMARY OF THE INVENTION

It is an object of the present invention to provide an ergonomic mouse for more comfortable operation.

It is another object of the present invention to provide an ergonomic mouse for more flexible use for both hands.

It is still another object of the present invention to provide an ergonomic mouse for left-hand user and right-hand user to reduce stock requirement.

To achieve above object, the present invention provides an ergonomic mouse for comfortable holding by user's palm and convenient operation by user's finger. The ergonomic mouse comprises a mouse body, a holding stick and a button member. The holding stick comprises an abutting section and a bottom pivotally assembled to a top portion of the mouse body to expose the abutting section out of the top portion. The button member is pivotally connected to a finger operation position at front end of the mouse body. The holding stick and the button member can be pivotally inclined to provide comfortable and convenient operation for user.

The various objects and advantages of the present invention will be more readily understood from the following detailed description when read in conjunction with the appended drawing, in which:

DETAILED DESCRIPTION OF THE INVENTION

Figure 2:
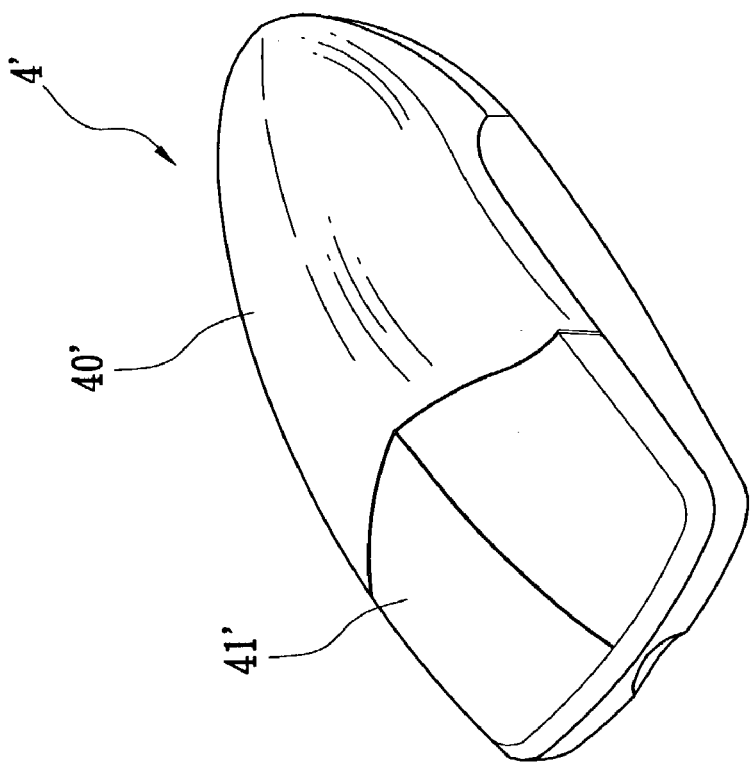
FIG. 2 shows a perspective view of another prior art mouse.
Figure 1:
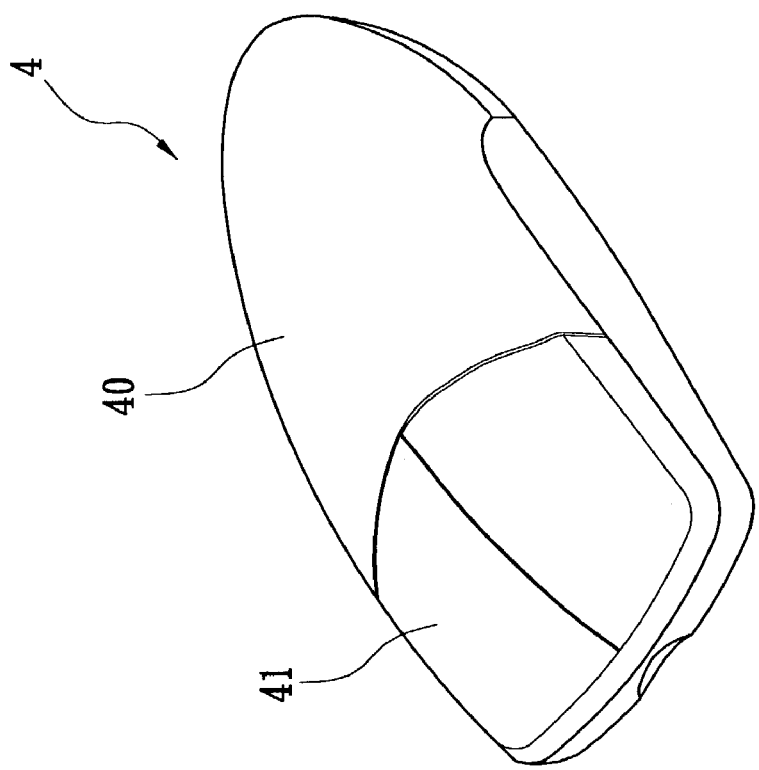
FIG. 1 shows a perspective view of prior art mouse.
Figure 3:
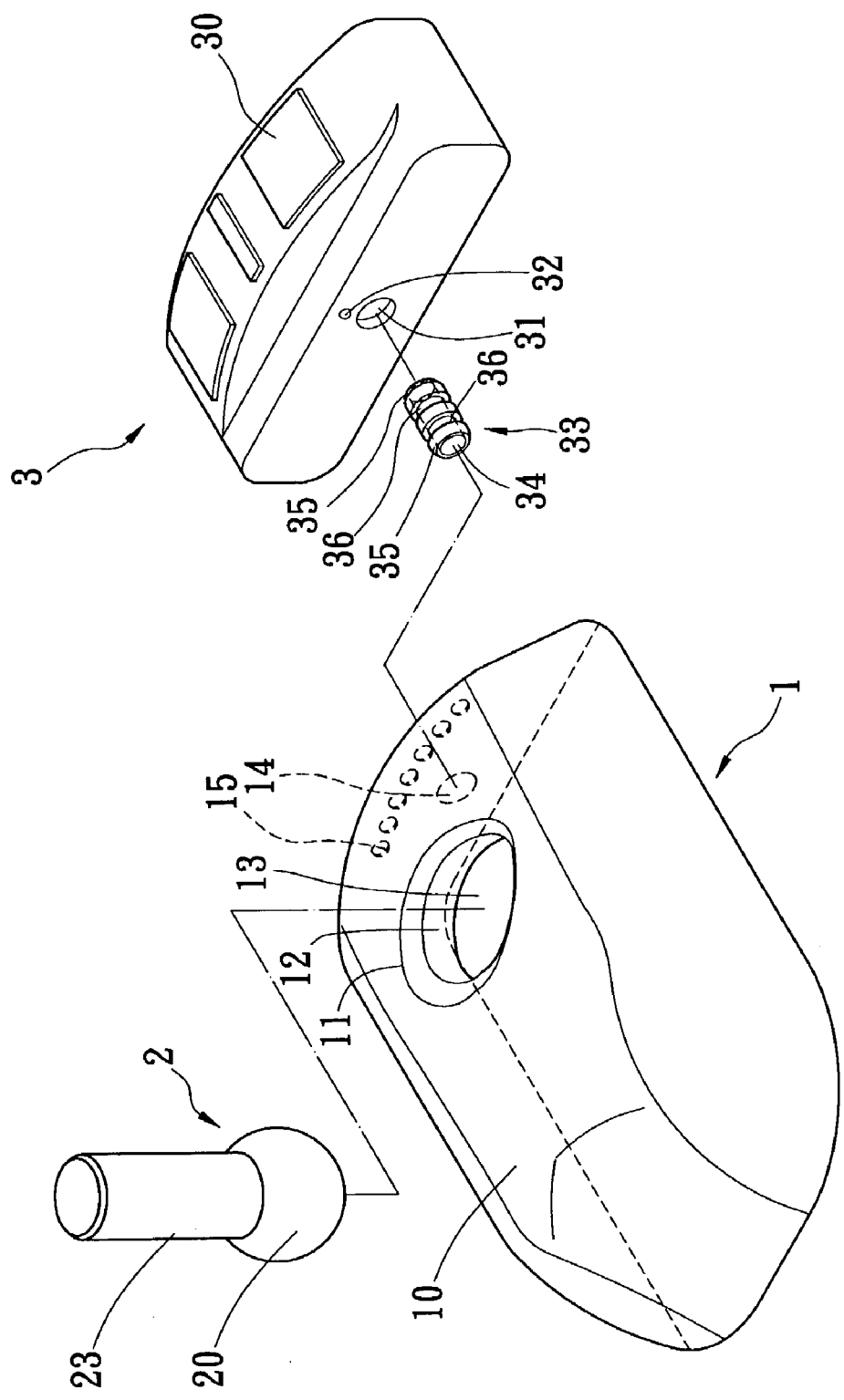
FIG. 3 shows an exploded view of the mouse of the first preferred embodiment of the present invention.
Figure 4:
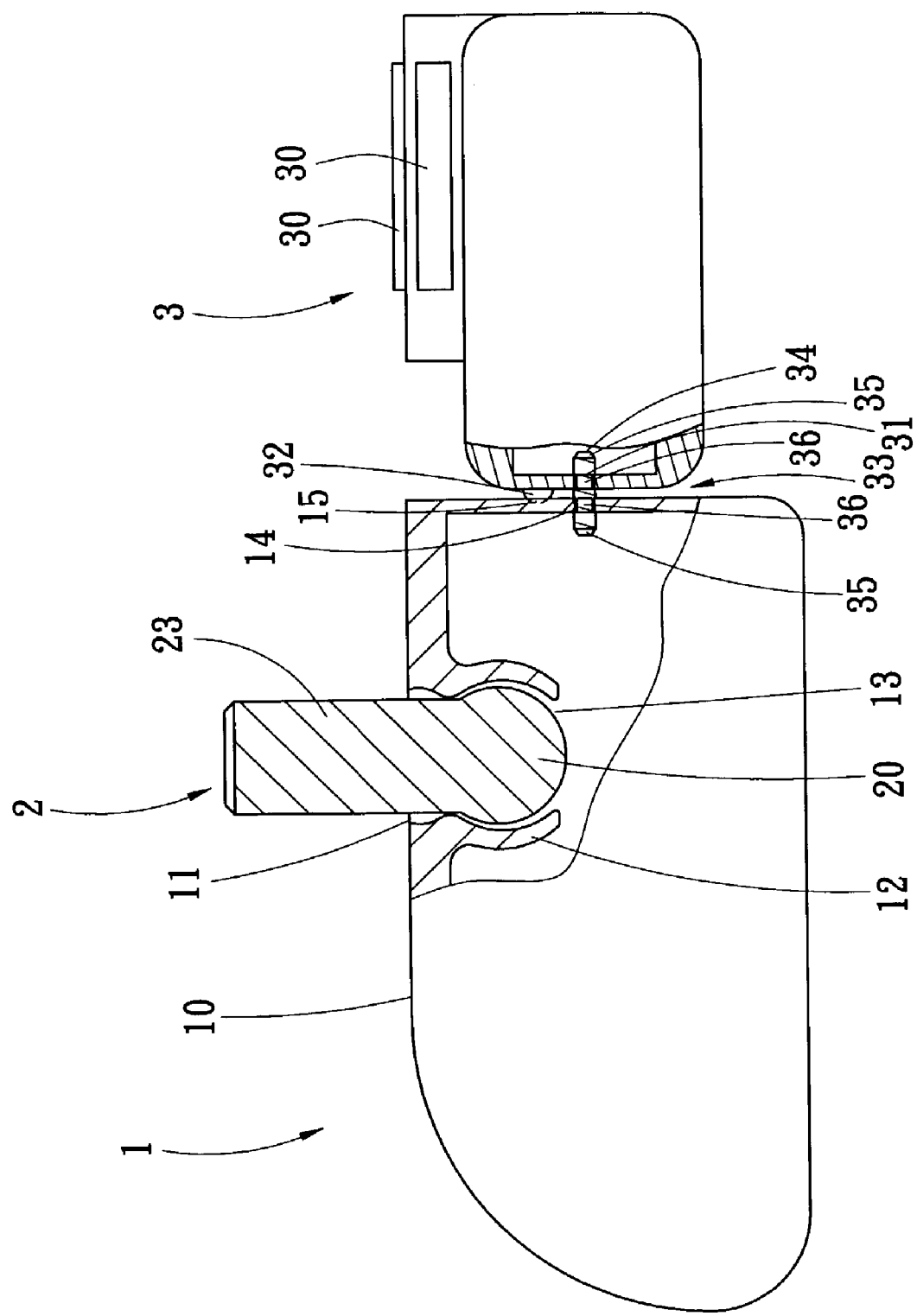
FIG. 4 shows a partial section view of the mouse of the first preferred embodiment of the present invention.

With reference to FIGS. 3 and 4, the present invention is intended to provide an ergonomic mouse suitable for holding with palm and clicking with finger. The ergonomic mouse of the present invention comprises a body 1, a holding stick 2 and a button member 3.

The body 1 has a curved top portion 10 for holding by palm and has a recess 11. The recess 11 has a downward-projecting circular wall 12 with an opening 13 at bottom thereof. The body 1 has a pivotal hole 14 at front side thereof and a plurality of clamping dimples 15 around the pivotal hole 14 and concentric at the pivotal hole 14.

The holding stick 2 comprises an abutting section 23 with a ball section 20 at bottom thereof and fit into the downward-projecting circular wall 12. The abutting section 23 passes through the opening 13 and projects out of the recess 11. The ball section 20 is received in the downward-projecting circular wall 12 and the abutting section 23 projects out of the curved top portion 10. The holding stick 2 can be freely rotated as long as the ball section 20 is constrained in the downward-projecting circular wall 12.

The button member 3 has button 30 or wheel at top face thereof and the button member 3 is pivotally connected to the body 1 through pivotal means. The pivotal means comprises a pivotal hole 31 at one side of the button member 3 and corresponding to the pivotal hole 14 at front side of the body 1. The button member 3 has a clamping bump 32 beside the pivotal hole 31 and corresponding to one of the clamping dimples 15. A pivotal member 33 is pivotally connected between the pivotal holes 31 and 14 to pivotally connect the button member 3 and the body 1. The pivotal member 33 has a hollow duct 34 for wiring between the button member 3 and the body 1. The pivotal member 33 has bevels 35 at both ends thereof for inserting into the pivotal holes 31 and 14 and has annulus ring 36 at center thereof for locking the button member 3 and the body 1 such that the button member 3 is pivotally connected to front position of the body 1 for operation of user finger. The button member 3 can be clamped to the body 1 with adjustable rotation angle by clamping the clamping bumps 32 with respect to the clamping dimples 15 to adapt for user with finger or hand of different sizes.

Figure 5:
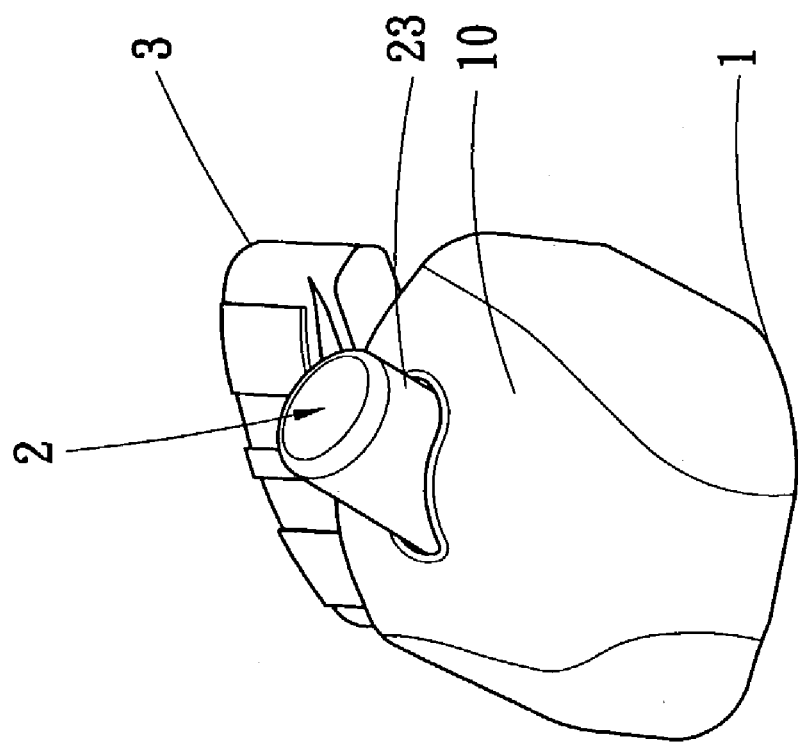
FIG. 5 shows a perspective view of the mouse of the first preferred embodiment of the present invention used by a left hand.

With reference to FIG. 5, when a left-hand user operates the ergonomic mouse according to the present invention, his palm is attached to the top portion 10 and the abutting section 23 of the holding stick 2 is inclined rightward such that the palm is inclined leftward to provide more comfortable operation. Moreover, the button member 3 is pivotally rotated by user finger such that the button member 3 is inclined leftward and clamped by clamping the clamping bumps 32 with respect to the clamping dimples 15.

Figure 6:
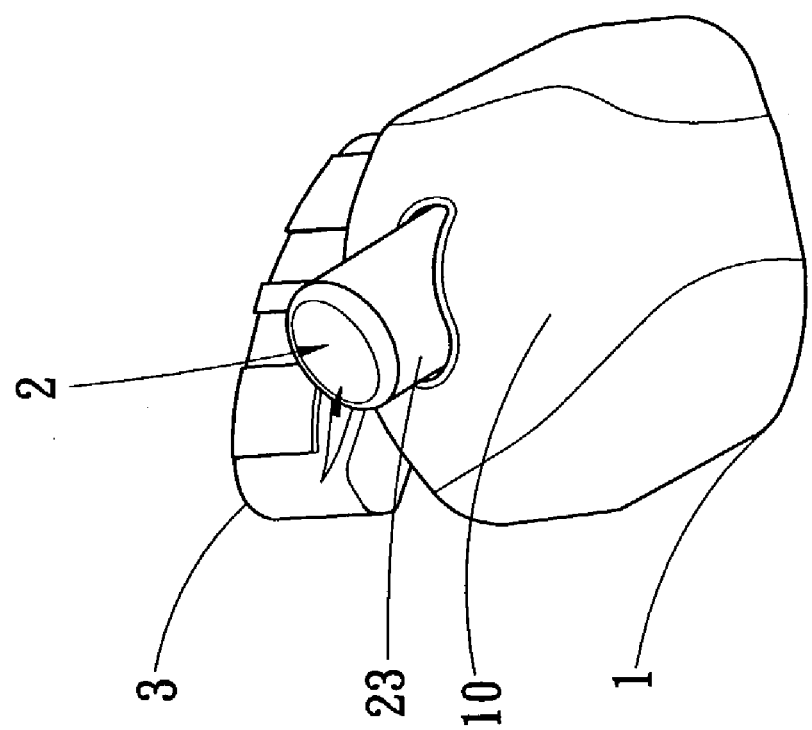
FIG. 6 shows a perspective view of the mouse of the first preferred embodiment of the present invention used by a right hand.

With reference to FIG. 6, when a right-hand user operates the ergonomic mouse according to the present invention, the abutting section 23 of the holding stick 2 and the button member 3 are inclined in a opposite direction. Similarly, the right-hand user can also comfortably operate the mouse.

Figure 7:
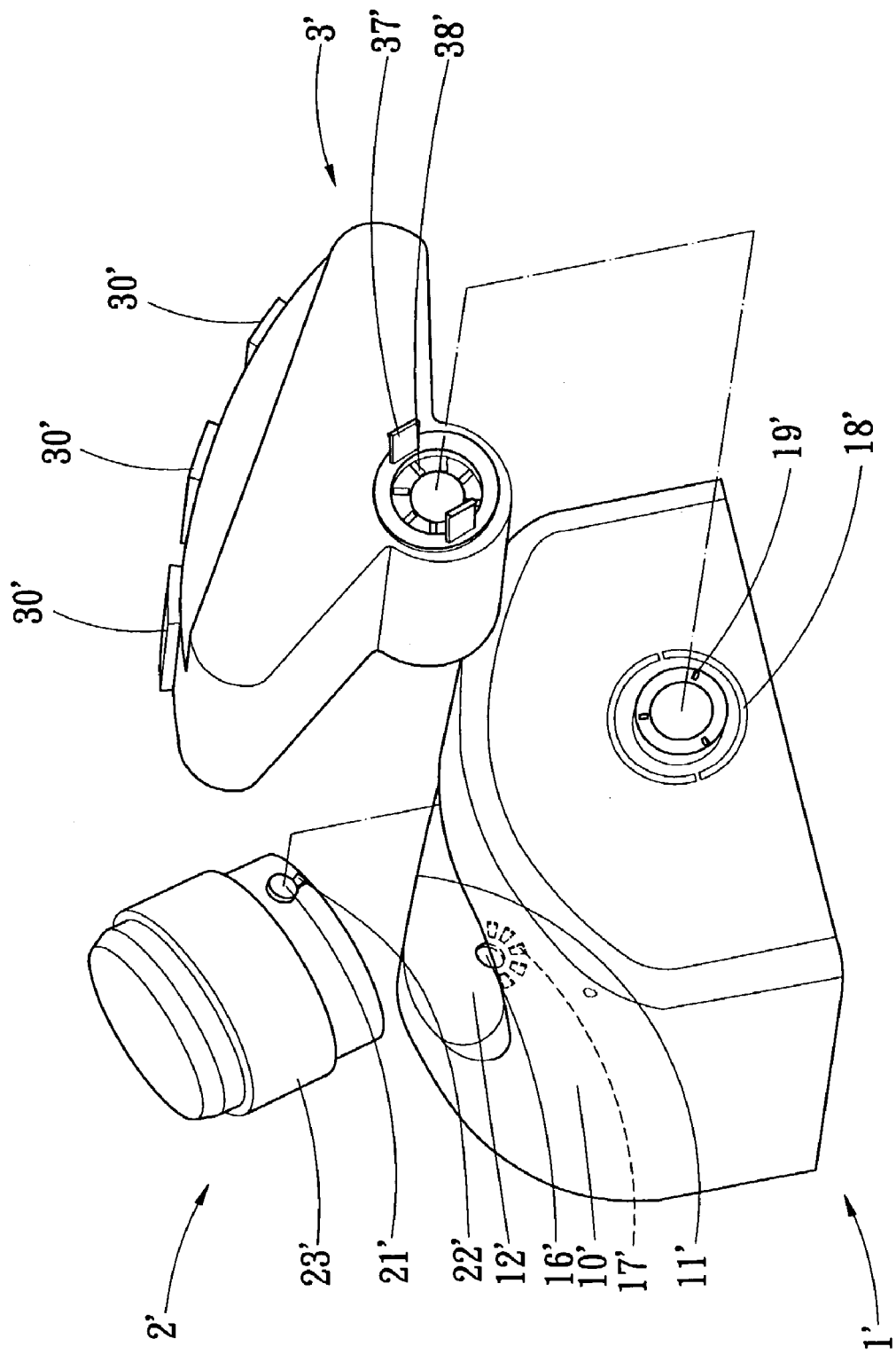
FIG. 7 shows an exploded view of the mouse of the second preferred embodiment of the present invention.

FIG. 7 shows the second preferred embodiment of the present invention, the mouse body 1' has a top portion 10' with a recess 11' at a holding position. The recess 11' has wall 12' with pivotal hole 16' and clamping dimples 17' around the pivotal hole 16'. The clamping dimples 17' are concentric with the center of the pivotal hole 16'. The mouse body 1' has locking groove 18' with clamping bumps 19' at inner face thereof. The mouse has a holding stick 2' with an abutting section 23' and a post 21' and clamping bump 22' at bottom thereof. The post 21' is pivotally connected to the pivotal hole 16' in the recess 11' and the clamping bump 22' is engaged to corresponding clamping dimple 17' such that the abutting section 23' exposes out of the top portion 10'. The holding stick 2' is freely rotated in the wall 12' of the recess 11'. It should be noted that the provision of the clamping dimples 17' and the clamping bump 22' provide flexible adjustment of the mouse for user with different finger and palm sizes. The mouse has a button member 3' with button 30' or wheel at top side thereof. The button member 3' is pivotally connected to the mouse with a pivotal means. The pivotal means comprises locking rib 37' at one side of the button member 3' and locked to the locking groove 18'. A plurality of clamping dimples 38' are provided circularly on inner face of the locking rib 37' and engaged with the clamping bumps 19' such that the button member 3' is pivotally connected to the body 1'. The relative position of the button member 3' and the body 1 is adjusted by clamping the clamping dimples 38' with the clamping bumps 19'.

Figure 8:
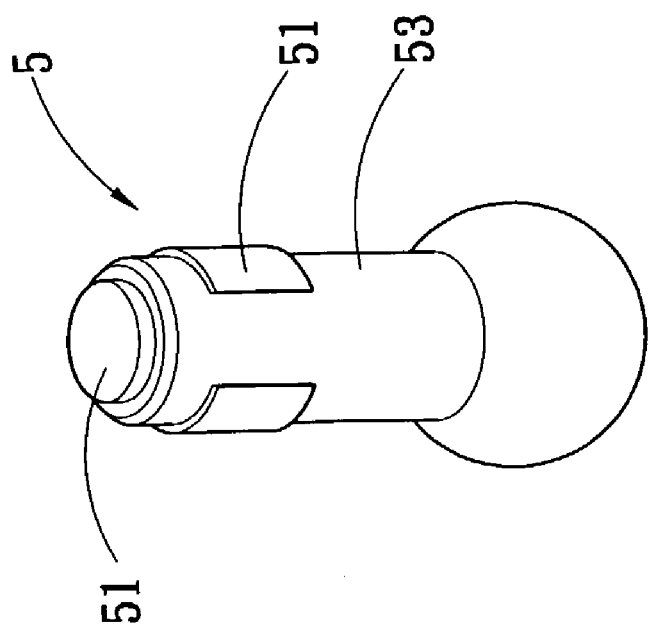
FIG. 8 shows a perspective view of the mouse of the present invention with button on the holding stick.

With reference to FIG. 8, the mouse has a holding stick 5 with an abutting section 53. The abutting section 53 has a button 51 to provide more flexible function.

Figure 9:
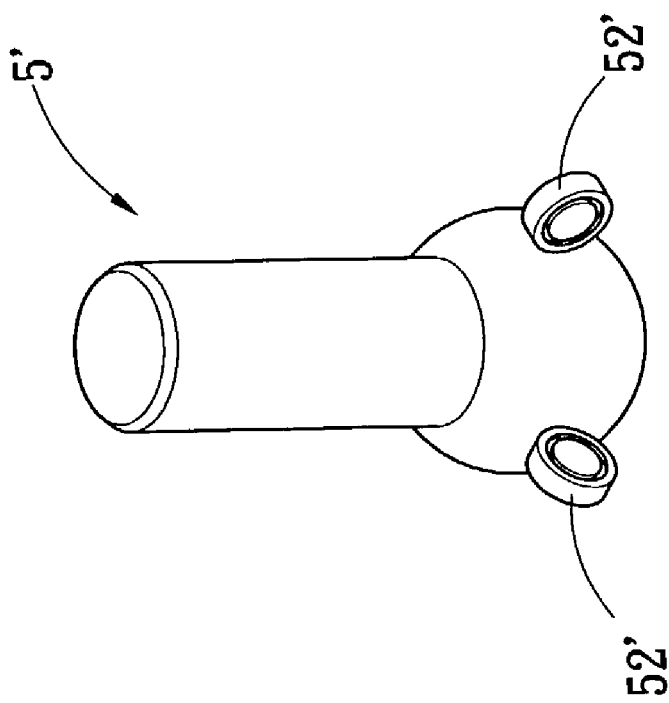
FIG. 9 shows a perspective view of the mouse of the present invention with touch sensor on the holding stick.

With reference to FIG. 9, the mouse has a holding stick 5' with bottom lateral portion thereof placed in proximity of at least one touch sensor 52'. The touch sensor 52' can sense a moving direction of the bottom lateral portion of the holding stick 5' such that the holding stick 5' can function as a joy stick and rotate to move cursor in display.

The ergonomic mouse of the present invention has following advantages:

1. The holding stick and the button member are pivotally arranged to provide more comfortable operation.
2. The holding stick and the button member are pivotally arranged to provide more flexible use for both hands.
3. The holding stick and the button member are pivotally arranged to provide convenient use for left-hand user and right-hand user to reduce stock requirement.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An ergonomic mouse for providing comfortable holding by a user's palm, comprising:

a mouse body having a top portion as a holding position for the palm;

a holding stick comprising an abutting section, the holding stick having a bottom pivotally assembled to the top portion of the mouse body to expose the abutting section out of the top portion, the abutting section being pivotally adjusted to fit a holding portion of the palm; and a button member pivotally connected to a finger operation position at a front end of the mouse body by a pivotal means whereby the button member can be pivotally inclined by the finger;

wherein said button member rotates about an axis parallel to a longitudinal direction of the finger;

wherein the top portion has a recess in which the bottom of the holding stick is pivotally assembled and the holding stick rotates on at least one axis not parallel to the vertical axis of the mouse body; and wherein the holding stick with the abutting section as a handling position on the hand for the holding stick is inclined to rightward/leftward such that the palm is inclined leftward/rightward by the user's palm being attached to the top portion to provide a more comfortable operation.

2. An ergonomic mouse for providing comfortable holding by a user's palm, comprising:

a mouse body having a top portion as a holding position for the palm; and a holding stick comprising an abutting section, the holding stick having a bottom pivotally assembled to the top portion of the mouse body to expose the abutting section out of the top portion, the abutting section being pivotally adjusted to fit a holding portion of the palm;

wherein a recess is formed on the top portion of the mouse body, the recess has a downward-projecting wall with a pivotal hole and a plurality of clamping dimples around the pivotal hole and being concentric with a center of the pivotal hole, the holding stick having a post at the bottom thereof and pivotally connected to the pivotal hole, the holding stick having a clamping bump corresponding to one of the clamping dimples.

3. The ergonomic mouse as in claim 2, wherein the abutting section has a button.

4. The ergonomic mouse as in claim 2, wherein at least one touch sensor is provided in proximity of a bottom lateral side of the holding stick.

5. An ergonomic mouse for providing comfortable operation for a user's finger, comprising:

a mouse body; and a button member pivotally connected to a finger operation position at a front end of the mouse body by a pivotal means whereby the button member can be pivotally inclined by the finger;

wherein said button member rotates about an axis parallel to a longitudinal direction of finger; and wherein the pivotal means comprises a locking groove at front side of the mouse body and having clamping bumps at inner face thereof, the pivotal means further comprises a locking rib at one side of the button member and locked to the locking groove and having a plurality of clamping dimples circularly around the locking rib for engaging with the clamping bumps.

* * * * *